Feb. 7, 1967　　　　　　　L. A. TOTH　　　　　　　3,302,984
TWO-POINT SELF-ALIGNING BEARING SUPPORT
Filed March 13, 1964　　　　　　　　　　　　　2 Sheets-Sheet 2

LEO A. TOTH
INVENTOR

BY Mason, Porter, Diller & Stewart

ATTORNEYS

United States Patent Office 3,302,984
Patented Feb. 7, 1967

3,302,984
TWO-POINT SELF-ALIGNING BEARING SUPPORT
Leo A. Toth, South Bend, Ind., assignor to The Torrington Company, Torrington, Conn., a corporation of Connecticut
Filed Mar. 13, 1964, Ser. No. 351,634
5 Claims. (Cl. 308—29)

The following specification relates to a two-point self-aligning bearing support which provides an extended support for better distribution of the load of the rolling elements and the races in the bearing.

This is particularly adapted for heavy duty such as exists in the support of a journal or neck of a mill-roll. The bearing support deflects to the extent necessary to compensate for misalignment and maladjustment.

One of the objects of this invention is to provide a support for a shaft bearing over an extended radial distance, thus distributing the load and increasing capacity of the bearing accordingly.

A further object of the invention is to provide for the bearing support to realign to conform with the operating condition of the particular shaft with which it is used.

A further object of the invention is to decrease the over-all height of the bearing assembly.

Among the objects of the invention is to provide flexibility in the bearing chock between the supporting areas.

The above and other advantages of the invention will appear from the following description as illustrated by way of example in the accompanying drawings in which.

Figure 1:
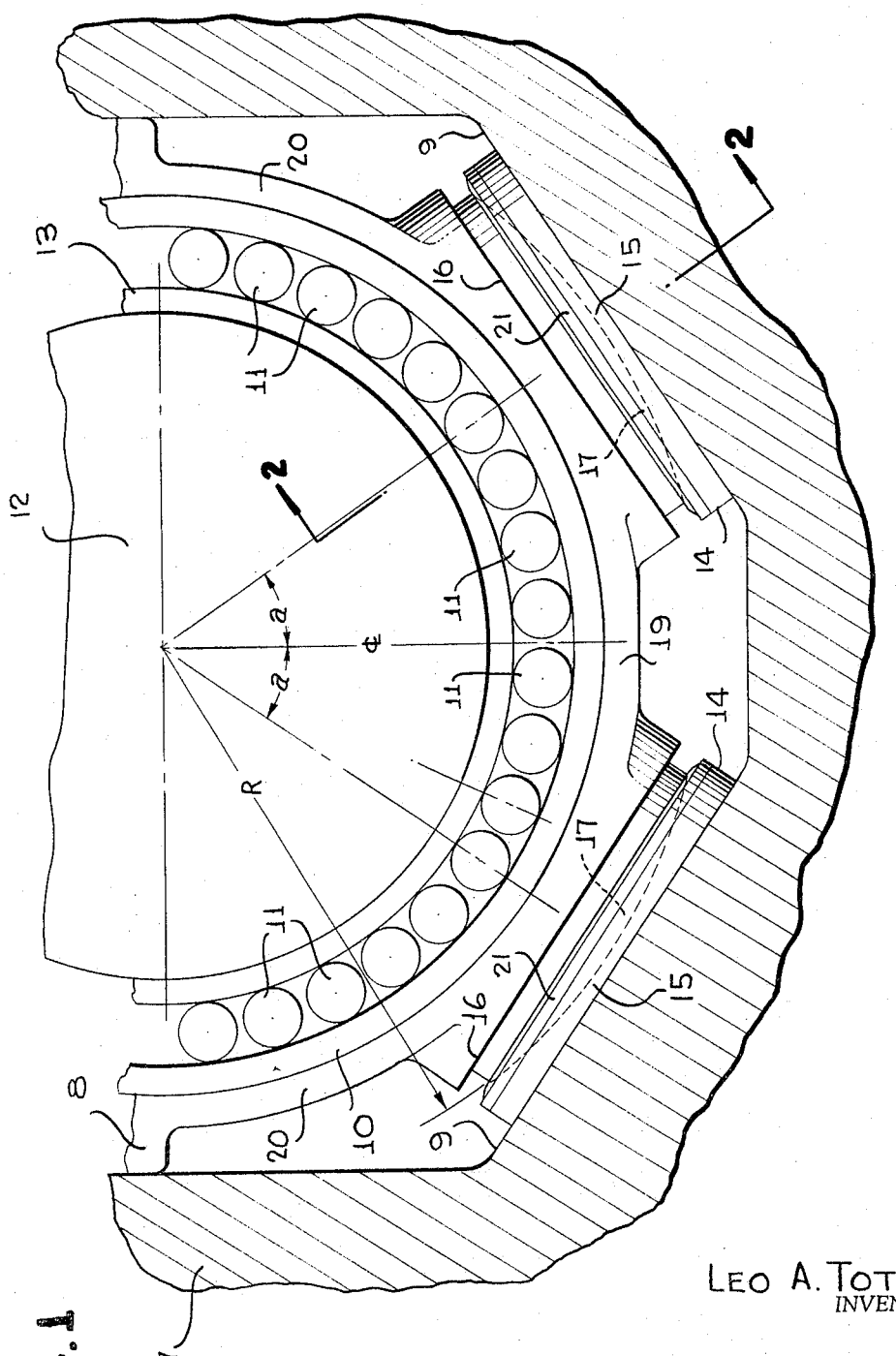
FIGURE 1 is a schematic end view partially in cross-section of the improved self-aligning bearing support.
Figure 3:
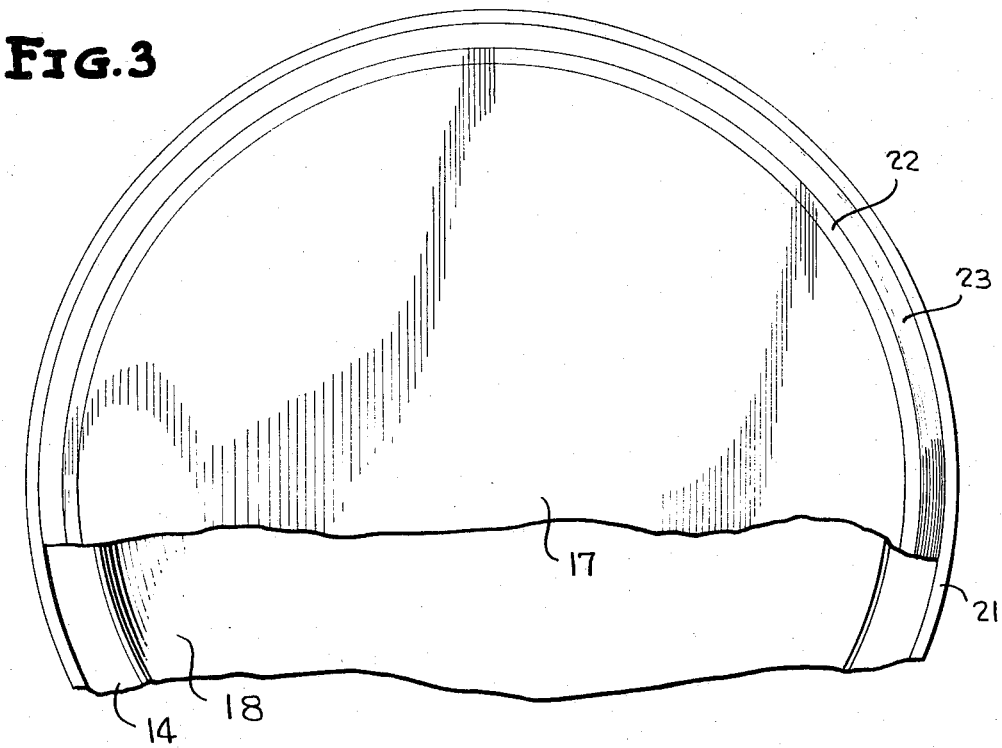
FIGURE 3 is a plan view of the support.
Figure 2:
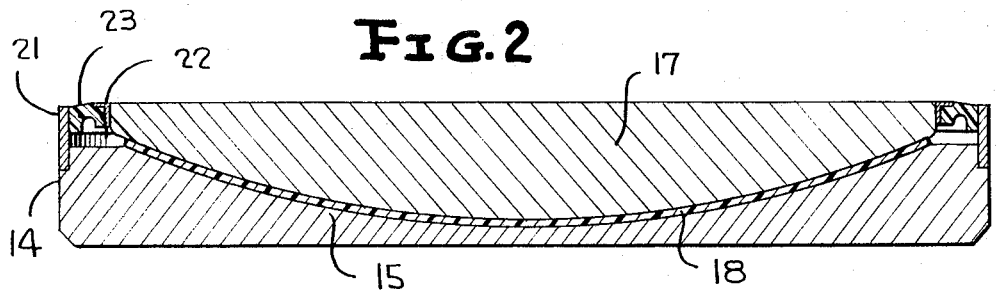
FIGURE 2 is an enlarged vertical cross-section of the bearing support on the line 2—2 of FIGURE 1.
Figure 4:
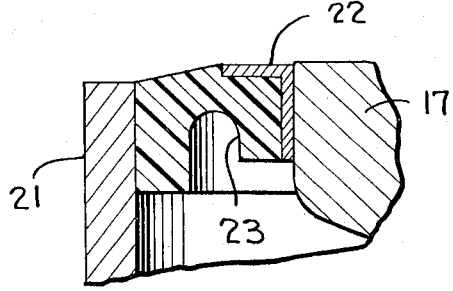
FIGURE 4 is a similar cross-section of the sealing means in the support.

In brief, the improved bearing support comprises two radially spaced bearing units on the bearing housing or chock. These cooperate with tangentially arranged aligning units. Thus the support of the journal is more widely distributed radially. At the same time the over-all height of the bearing is reduced. Each individual bearing unit is self-aligning. The rigid bearing elements on the chock are connected by relatively more flexible areas facilitating the adjustment of the supporting elements.

On the drawings there has been shown the frame 7 of a rolling mill stand or like heavy duty support. A journal bearing or chock 8 rests within the opening of the frame 7. The upper half of the journal bearing 8 is rigid, while the lower half has alternate flexible and rigid areas.

The bottom of the frame opening has diverging upwardly inclined walls 9, 9.

The chock 8 has a bearing member which is a ring or liner 10. This liner supports a series of bearing rollers 11, of which 37 have been used in the particular example. The number, however, can be varied according to the demands of each installation.

These rollers support a shaft or journal 12, which has a facing or race-way 13 resting upon the rollers 11.

It will be understood that the liner 10, the rollers 11 and the race-way 13 are concentrically disposed with respect to the axis of the journal 12. In like manner, the diverging inclined walls 9, 9 are perpendicular to the radii through their centers.

Each inclined wall 9 supports an aligning unit 14, 14, in sliding engagement over the surfaces of the walls.

Each aligning unit has a seat 15 slidably supported upon the adjacent inclined bottom wall 9.

The chock 8 has a rigid boss 16 opposite each seat 15. These bosses have faces parallel to the walls 9, 9. An upper plate 17, 17 rests upon each seat 15, 15, and in turn supports the adjacent boss 16.

The contiguous faces of the seat 15 and the upper plate 17 are spherical with a radius R (as indicated in FIGURE 1) and concentric to the axis of the bearing.

The surfaces of the seats and plates are adequately lubricated as indicated by the deposit or liner 18. This lubricant may be a suitable dry film such as molybdenum disulphide or like material. Alternatively it may be an anti-friction synthetic composition such as is known by the trademark Teflon, known in the art as tetrafluoroethylene.

The bearing surfaces between the seat and the plate are sealed by an outer band 21 attached to the seat, and an inner band 22 formed at the rim of the plate. These are connected by a resilient molded seal 23, as shown on the drawings. The seal has a channel cross-section. The amount of adjustment needed during alignment is so slight that the seal is not broken.

The bosses 16, 16 are separated by an intermediate flexible portion 19 of the journal bearing 8.

In like manner, flexible portions 20, 20 connect the bosses 16 with the upper half of the journal bearing 8.

The bosses are determined to be spaced apart a multiple of the number of the bearing rollers selected according to the ratio 180° divided by 37, or 4.86° occupied by each roller half. The angle "a" from the vertical center line to the center of the rigid section should be as small as possible and yet large enough to permit some flexibility between the rigid sections. Ignoring the two lowermost rollers which are subtended by the intermediate portion 19, and assuming five rollers to be subtended by each boss, the angular displacement "a" from a geometrical center line to the boss and each aligning unit is approximately 34 degrees, calculated by determining that two and one half rollers subtended by each boss plus one of the lowermost rollers equals three and one half rollers subtended by an arc measured from the geometrical center line of the bearing to the center line of each boss, multiplied by the 9.72° subtended by each roller. Any other angle chosen would give less desirable results. However, if the arcuate length of any of the rigid sections 8, 16 or the number of rollers is changed, another angle will suit the condition.

It has been found that when a bearing has a single uniform support capable of re-alignment, then a maximum of one fifth of the rollers is effective. In the given instance, the effective number would be slightly more than seven. However, by the use of the two spaced rigid bosses, each of which is subtended by more than five rollers, a support by at least ten rollers is effective as compared with the maximum seven in the use of a single support.

The above substitution of two spaced supporting bosses, individually supported in turn on separate seats and with possibility of individual alignment, has material advantages. In the first place, moving the supporting boss away from the vertical axis of symmetry affords a reduction in the over-all height of the bearing structure. Moreover, there is a material increase in the number of sustaining rollers. Further, individual adjustment between the seats and the corresponding plates offers an effective mode of re-alignment.

There is also an increased capacity of the bearing due to the increase in the number of sustaining rollers. Also the most desirable flexibility of the journal bearing 8 is attained.

The preferred form of the invention having been illustrated and described by way of example, permits variations in minor details in structure and materials within the scope of the following claims.

What I claim is:

1. A self-aligning bearing support comprising a frame having spaced upwardly flaring bottom walls, a seat slidably supported on an upper surface of each wall, a journal bearing in the frame, means for supporting a journal in the bearing, the upper surface of each seat being spherical and concentric with the axis of the bearing, a boss on the bearing opposite each seat, a plate on each seat supporting a boss, said plates having spherical lower surfaces complementary to and adjustably received in the upper surfaces of the seats and a layer of lubricant between said surfaces.

2. A self-aligning bearing support comprising a frame having spaced upwardly flaring bottom walls, a seat on each wall, a journal bearing in the frame, means for supporting a journal in the bearing, the upper surface of each seat being spherical and concentric with the axis of the bearing, a boss on the bearing opposite each seat, said bearing having a flexible section on each side of each boss, a plate on each seat supporting a boss, said plates having spherical lower surfaces complementary to and adjustably received in the upper surfaces of the seats and a layer of lubricant between said surfaces.

3. A self-aligning bearing support comprising a frame having spaced upwardly flaring bottom walls, a journal bearing in the frame, means for supporting a journal in the bearing, each bottom wall being disposed at a right angle to the line from the axis of the journal bearing to the mid-point of the bottom wall, a rigid seat slidably supported on an upper surface of each bottom wall, the upper surface of each seat being spherical and concentric with said axis, a boss on the bearing opposite each seat, a plate on each seat supporting a boss, said plates having spherical lower surfaces complementary to the upper surfaces of the seats, and a layer of lubricant between said surfaces.

4. A self-aligning bearing support comprising a frame having spaced upwardly flaring bottom walls, a journal bearing in the frame, means for supporting a journal in the bearing, each bottom wall being disposed at a right angle to the line from the axis of the journal bearing to the mid-point of the bottom wall, a rigid seat slidably supported on an upper surface of each bottom wall, the upper surface of each seat being concave and concentric with said axis, a boss on the bearing opposite each seat, a plate on each seat supporting a boss, said plates having convex lower surfaces complementary to the upper surfaces of the seats and a layer of lubricant between said surfaces.

5. A self-aligning bearing support comprising a frame having spaced upwardly flaring bottom walls, a journal bearing in the frame, said bearing having two depending spaced bosses and relatively flexible portions between and on each side of each boss, a journal in the bearing, a rigid seat on each wall opposite a boss, the upper surfaces of said seats being spherical and concentric with the axis of the housing, a plate on each seat supporting the adjacent boss, said plates having spherical lower surfaces complementary to the upper surfaces of the seats and a layer of lubricant between said surfaces.

References Cited by the Examiner

UNITED STATES PATENTS

| | | | |
|---|---|---|---|
| 767,360 | 9/1904 | Stephenson | 308—55 |
| 1,304,832 | 5/1919 | Weibull | 308—72 |
| 1,897,771 | 2/1933 | Sherman | 308—72 X |
| 1,919,489 | 7/1933 | Treschow | 308—72 X |
| 2,345,321 | 3/1944 | Brown | 308—72 |
| 2,355,507 | 8/1944 | Brown | 308—72 |
| 2,695,198 | 11/1954 | Brugger | 308—72 X |
| 3,056,615 | 10/1962 | Breitenstein | 308—36.1 X |
| 3,093,426 | 6/1963 | Cornford | 308—73 |

FOREIGN PATENTS

| | | |
|---|---|---|
| 493,700 | 5/1919 | France. |
| 1,052,632 | 9/1953 | France. |

OTHER REFERENCES

German application DAS 1,045,736, 12/1958.

MARTIN P. SCHWADRON, *Primary Examiner.*

DAVID J. WILLIAMOWSKY, *Examiner.*

R. F. HESS, *Assistant Examiner.*